United States Patent [19]

Johnson et al.

[11] 4,291,201

[45] Sep. 22, 1981

[54] PUSH-BUTTON DIAL ASSEMBLY FOR TELEPHONES

[75] Inventors: Walter R. Johnson, Simi Valley; Gary M. Petaja, Sierra Madre, both of Calif.

[73] Assignee: American Telecommunications Corporation, El Monte, Calif.

[21] Appl. No.: 28,166

[22] Filed: Apr. 9, 1979

[51] Int. Cl.³ .......................... H04M 1/50; H04M 1/23
[52] U.S. Cl. .................................. 179/90 K; 200/5 R; 200/5 A; 200/6 A; 340/365 R
[58] Field of Search ................. 200/1 TK, 5 A, 6 BB, 200/159 R, 159 A, 159 B, 34 O, 6 A, 5 R; 179/90 K; 340/365 S, 365 R, 365 A

[56] References Cited

U.S. PATENT DOCUMENTS

| | | | |
|---|---|---|---|
| 2,896,034 | 7/1959 | Nolden et al. | 200/6 A |
| 2,994,531 | 8/1961 | Eberwein | 200/5 A |
| 3,080,457 | 3/1963 | Jansson et al. | 200/5 R |
| 3,207,862 | 9/1965 | Robbins | 200/5 R |
| 3,210,484 | 10/1965 | Dorsey | 200/5 R |
| 3,506,795 | 4/1970 | Schmidt | 340/365 R |
| 4,146,767 | 3/1979 | Murata | 200/159 B |

*Primary Examiner*—Gerald L. Brigance
*Attorney, Agent, or Firm*—Christie, Parker & Hale

[57] ABSTRACT

A push-button assembly in which a cluster of push-buttons arranged in a circle or in a rectangular matrix, when depressed, engage a common plate positioned beneath the push-buttons. The plate is pivotally supported at its center by a spring which urges the plate towards the push-buttons. When any of the push-buttons is depressed it engages the plate at a point spaced from the central pivot. This causes the plate to tilt about its outer periphery, compressing the spring and actuating a common switch.

5 Claims, 6 Drawing Figures

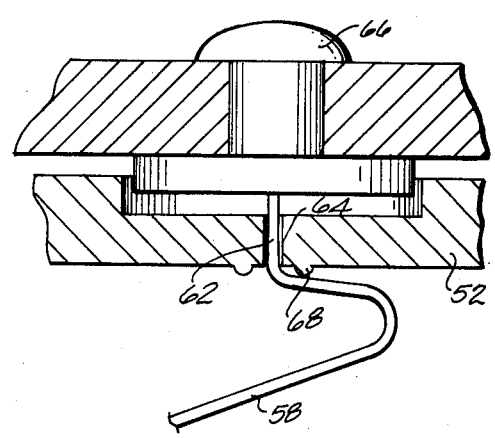

PUSH-BUTTON DIAL ASSEMBLY FOR TELEPHONES

FIELD OF THE INVENTION

This invention relates to push-button switches and, more particularly, to a push-button dial assembly for telephones.

BACKGROUND OF THE INVENTION

The Touch-Tone dial system has become the standard dialing system for conventional telephones, largely replacing the older rotary dial. The standard touch-tone dials have the push-buttons arranged in a rectangular matrix pattern. Each button activates a switch to energize a tone generator of unique frequency. In addition, the push-buttons are arranged to activate a common switch for disconnecting the transmitter while a tone generator is operating. The common switch is operated through a matrix of rods, one for each column and row of buttons. These rods are rotated by the push-buttons through cams. The rod and cam linkage assembly is relatively complex, costly to assemble, and bulky in its implementation. Furthermore, there is a need for touch tone push-button dials which are arranged in the more conventional circular configuration of the rotary dial. The common switch operating arrangement of the matrix assembly is not readily adaptable to a rotary push-button configuration.

SUMMARY OF THE INVENTION

The present invention provides a push-button assembly for a telephone, for use with either a Touch-Tone system or a pulse-dialing system, in which the push-buttons may be arranged in either a rectangular matrix or a circular pattern. The push-button assembly is characterized by its simplicity of design, ease of assembly and economy of manufacture, yet is rugged, durable and aesthetically pleasing. A significant feature of the push-button assembly is a switch plate which is supported at its center by a spring element that urges the plate toward the back of the push-buttons. Each of the push-buttons, when depressed, engages the plate at a point offset from the spring support, causing the plate to tilt or wobble about its outer periphery and depress the spring. The spring forms a moving contact of a normally closed switch. When the spring is depressed by the tilting of the switch plate, the switch contacts are separated. Thus a common switch, activated by depressing any one of the push-buttons, is provided which is used to disconnect the transmitter circuit while a push-button is depressed. Each push-button has associated with it a normally open switch. The switch, when closed by operation of the push-button, activates an associated tone generating circuit.

BRIEF DESCRIPTION OF THE DRAWINGS

For a more complete understanding of the invention, reference should be made to the accompanying drawings, wherein:

FIG. 6 is a detailed view of the common switch.

DETAILED DESCRIPTION

Figure 1:
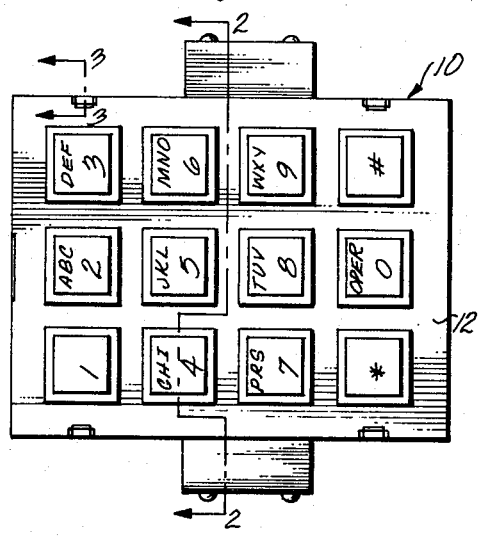
FIG. 1 is a top view of the push-button assembly in a rectangular matrix configuration.
Figure 3:
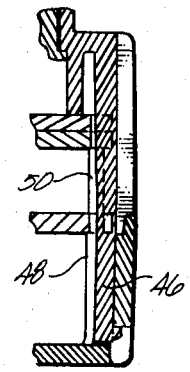
FIG. 3 is a partial view in section taken along the line 3—3 of FIG. 1.

Referring to the drawings in detail, the numeral 10 indicates generally a push-button dial assembly for a Touch-Tone telephone having the conventional rectangular matrix configuration of push-buttons. The assembly includes a housing 12 molded from a suitable plastic material. The housing is molded with a plurality of square skirts 14 projecting from the top surface 16 of the housing. Each skirt acts as a guide for a push-button 18 which is inserted from inside the housing and extends beyond the open end of the skirt 14. Each push-button is formed with a lip or flange 20 which abuts a shoulder 24 formed in the inside surface of the skirt 14 which serves as a stop for the push-button 18.

Positioned below the push-buttons 18 inside the housing 12 is a flat switch board 26. A molded rubber contact pad 28 is positioned between the top of the board 26 and the inwardly projecting portion of the skirts 14. The contact pad 28 includes twelve integrally molded contact buttons 30 having a cone-shaped portion 32 and a contact portion 34. The contact portion 34 has an outer conductive layer 36. When one of the push-buttons 18 is depressed, it causes the conically shaped portion 32 to fold on itself and move conductive surface 36 into contact with the top of the switch board 26. A switching action is provided by the conductive surface 36 as it contacts and shorts out printed circuit conductors on the top surface of the board 26. Because the contact 28 is molded of a resilient rubber material the conical portion returns to its initial shape when the pressure on the push-button 18 is removed, causing the push-button to snap back to its initial position and breaking the contact between the conductive surface 36 and the printed circuit on the board 26.

A second printed circuit board 40 is mounted in the housing 12 below the switch board 26, and the circuit elements for the multiple tone generator are mounted on the circuit board. Electrical connectors 42 provide the necessary electrical connections between the switch forming conductors on the switch board 26 and the tone generator circuits mounted on the printed circuit board 40. The push-button assembly includes a molded plastic cover 44 which fits against the housing 12 to provide a fully enclosed space for the switch board and the tone generator. The cover is held in place by a plurality of latches 46 which are integrally molded with the housing and lock the cover in place. The cover is molded with spacer lugs 48 and 50 which hold the board 26 and 40 in fixed spaced parallel relationship.

One of the features of the present invention is the provision of a common normally closed switch which is opened by depressing any one of the twelve push-buttons. This switch, positioned between the boards 26 and 40, includes a rectangular switch plate 52 having a plurality of integrally molded pins 54, there being one pin for each of the twelve push-buttons. The pins 54 project upwardly through holes 56 in the switch board 26 and aligned holes in the contact pad 28. Each of the pins 54 is positioned to be engaged by the lip 20 at a corner of an associated push-button 18 when it is depressed. The switch plate 52 is held in place below the switch board 26 by a leaf spring 58. The leaf spring is mounted in cantilever fashion by a pair of rivets 60 to the top of the printed circuit board 40 and extends upwardly at an obtuse angle to a reverse bend portion which brings it back substantially tangent to the bottom surface of the switch plate 52. The end of the spring 58 is bent upwardly, as indicated at 62. The end 62 extends through a slotted opening 64 in the switch plate 52. The upper end of the spring 58 comes into contact with the surface of a rivet 66 extending through the switch board 26. As shown in the detail of FIG. 6, the reverse bent portion of the spring 58 bears against a rib 68 formed adjacent to the slot 64 in the switch plate 52. The rib acts as a bearing surface against which the spring presses, providing a pivot point about which the switch plate can tilt. The slot 64 is sufficiently large that the plate 52 can tilt relative to the spring without binding. The spring 58 and the rivet 66 form two contacts of a normally closed switch.

Figure 2:
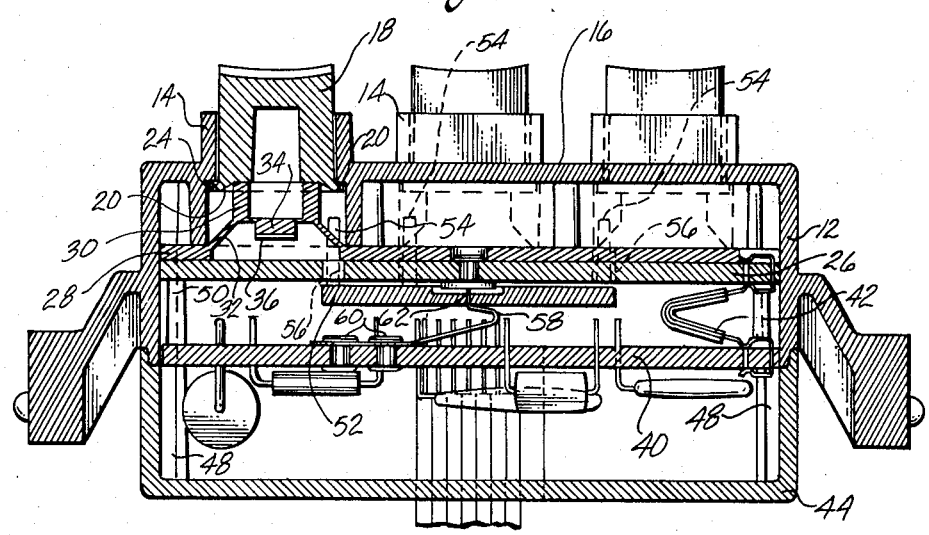
FIG. 2 is a cross-sectional view taken substantially on the line 2—2 of FIG. 1.

Whenever one of the push-buttons 18 is depressed, it engages one of the pins 54, causing the plate 52 to tilt about the pivot point of the rib 68. The tilting of the plate 52 is restricted by its close proximity to the under surface of the board 26. It will be seen that when the board is tilted as far as it can, the raised edge will engage the under surface of the board 26. Further depression of the pin 54 by the push-button 18 causes the spring 58 to be bent downwardly breaking the contact between the upper end 62 of the spring and rivet 66. As viewed in FIG. 2, any of the four push-buttons on the left will tilt the switch plate 52 in a counterclockwise direction, whereas the push-buttons on the right will tilt the plate in a clockwise direction. The four center push-buttons also engage pins 54 which are offset to the left from the pivot point formed by the rib 68, so that the four push-buttons in the center row also tilt the switch plate 52 in a counterclockwise direction. Thus the tilting of the switch plate 52 by the push-buttons provides a simple yet effective way of breaking the common switch formed by the same spring which pivotally supports the plate 52.

Figure 4:
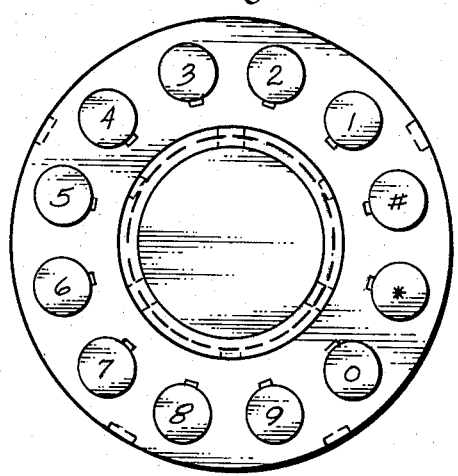
FIG. 4 is a top view of a push-button assembly with a circular push-button configuration.
Figure 5:
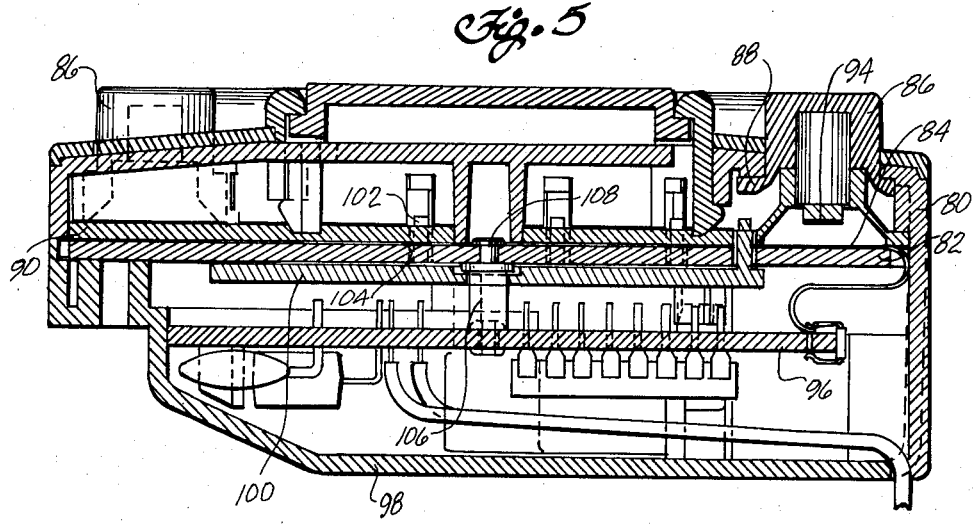
FIG. 5 is a sectional view taken on the line 5—5 of FIG. 4.

An alternative embodiment is shown in FIGS. 4 and 5 in which the push-buttons are arranged in a circular configuration rather than the rectangular matrix configuration. A molded plastic housing 80 having a circular periphery has a switch board 82 mounted therein on which switch contacts in the form of printed circuit conductors are formed on the top surface 84. The top of the housing is provided with twelve holes arranged in a circle through which project molded circular push-buttons 86. Each push-button includes a retaining lip 88 around the inner margin thereof. A circular rubber contact pad 90 has twelve integrally molded nipples 92 which provide resilient support for the buttons 86. A conductive pad 94 below each nipple engages the printed circuit switch contacts on the board 82 when the associated button 86 is depressed. A printed circuit board 96 is mounted inside a molded plastic cover 98. The cover is secured to the housing to form a fully enclosed assembly.

A circular switch plate 100 is positioned in the space between the switch board 82 and the printed circuit board 96. A plurality of integrally molded pins 102 project from the top of the plate 100 through holes 104 in the board 82. The pins are arranged in a circle and are positioned so as to be engaged by the inner margin of the retainer flange 88 of an associated push-button 86. The switch plate 100 is held in place by a switch contact spring 106 which is identical to the spring 58 described above. The lower end of the spring 106 is mounted on the circuit board 96 and the upper end extends through a slot in the switch plate 100 and engages a fixed switch contact 108 in the form of a rivet mounted in the center of the switch board 82. A common switch formed by the spring 106 and contact 108 is identical to the switch arrangement described above in connection with FIG. 6 involving the spring 58 and the contact 66. Again, depressing any one of the buttons 86 causes the retaining flange 88 to engage an associated one of the pins 102, causing the switch plate 100 to be tilted, compressing the spring 106 and breaking the contact with the fixed contact 108.

From the above description it will be seen that a push-button assembly is provided which is relatively simple in its construction, compact in design, and which provides a normally closed switch which is operated mechanically by any one of the twelve push-buttons in the dial. By careful design of the length of the pins 102, the push-buttons can make contact with the switch board 82 before breaking the contact at the common switch formed by the contacts 106 and 108. It has been found desirable in some instances to provide this make before break relation of the switches so that the initiation of the tone begins before the transmitter circuit is broken. This has the advantage that the click normally associated with the making and breaking of the transmitter circuit is masked by the sound produced in the receiver by the tone generators.

What is claimed is:

1. A multiple push-button switch comprising a frame member, a plurality of depressable push-buttons, means supporting each of the push-buttons on the frame member in a cluster, a common switch plate movably supported adjacent the back of the cluster of push-buttons, spring means mounted on the frame and engaging the switch plate for urging the switch plate toward the back of the push-buttons, means extending between each of the push-buttons and the switch plate for moving the switch plate against the urging of the spring means by depressing any one of the push-buttons, and switch means actuated by movement of the switch plate for breaking an electrical circuit when the switch plate is moved by any one of the push-buttons, the spring being a leaf spring mounted in cantilever fashion at one end to the frame member adjacent the switch plate, the other end of the leaf spring having a portion bearing against the switch plate, the end of the leaf spring bearing against the switch plate including a tip portion extending through an opening in the switch plate, the tip forming the moving contact of the switch means, the switch means including a fixed contact on the opposite side of the switch plate from the spring means, the tip portion normally contacting the fixed contact under the urging of the spring, movement of the switch plate by any of said push-buttons moving the plate and tip of the leaf spring away from the fixed contact to separate the contacts and break an electrical circuit.

2. A push-button dial assembly for a telephone comprising: a housing including one wall having a plurality of openings arranged in a predetermined pattern, a plurality of push-buttons projecting out of the housing through the openings, a switch board mounted inside the housing adjacent the push-buttons, switch means on the switch board associated with each push-button for closing a separate electrical circuit for each push-button, a switch plate positioned on the opposite side of the switch board from the push-buttons, spring means pivotally supporting the switch plate at a central point, means associated with each push-button engaging the plate away from the central pivot point through the switch board for tilting the switch plate about the pivot point when any of the push-buttons is depressed, and switch means associated with the switch plate for opening a common electrical circuit in response to tilting of the switch plate by any of the push-buttons, the spring means including a tip portion extending through an opening in the switch plate, the tip forming the moving contact of the switch means, the switch means including a fixed contact on the opposite side of the switch plate from the spring means, the tip portion normally contacting the fixed contact under the urging of the spring, tilting movement of the switch plate by any of said push-buttons moving the plate and tip of the leaf spring away from the fixed contact to separate the contacts and break an electrical circuit.

3. Apparatus of claim 2 wherein the push-buttons are arranged in a circle about a central axis aligned with the center of the switch plate.

4. Apparatus of claim 2 wherein the push-buttons are arranged in a rectangular matrix with the center of the matrix aligned with the center of the plate.

5. Apparatus of claim 2 wherein the switch means associated with each of the push-buttons includes a molded resilient rubber pad having a plurality of projecting nipples, each nipple projecting toward an associated one of the push-buttons, the nipples having conical wall portions, each push-button when depressed collapsing the associated nipple by folding the conical wall portion, the resilient nipple acting as a spring for returning the push-button when it is released.

* * * * *